United States Patent
Kameyama et al.

(10) Patent No.: US 8,939,223 B2
(45) Date of Patent: *Jan. 27, 2015

(54) DEVICE AND METHOD FOR SEQUESTERING A SUBSTANCE

(75) Inventors: Hiromichi Kameyama, Tokyo (JP); Susumu Nishio, Tokyo (JP); Ziqiu Xue, Kizugawa (JP); Toshifumi Matsuoka, Kyoto (JP)

(73) Assignee: Tokyo Gas Co., Ltd., Tokyo (JP)

( * ) Notice: Subject to any disclaimer, the term of this patent is extended or adjusted under 35 U.S.C. 154(b) by 363 days.

This patent is subject to a terminal disclaimer.

(21) Appl. No.: 13/386,532

(22) PCT Filed: Aug. 11, 2010

(86) PCT No.: PCT/JP2010/063622
§ 371 (c)(1),
(2), (4) Date: Jan. 23, 2012

(87) PCT Pub. No.: WO2011/019053
PCT Pub. Date: Feb. 17, 2011

(65) Prior Publication Data
US 2012/0118586 A1    May 17, 2012

(30) Foreign Application Priority Data
Aug. 12, 2009    (JP) .................................. 2009-187157

(51) Int. Cl.
*E21B 41/00*    (2006.01)

(52) U.S. Cl.
CPC ............ *E21B 41/0064* (2013.01); *Y02C 10/14* (2013.01)
USPC ........................................................ 166/402

(58) Field of Classification Search
CPC ......................... E21B 41/0057; E21B 41/0064
USPC .................................. 166/261; 405/52, 53, 59
See application file for complete search history.

(56) References Cited

U.S. PATENT DOCUMENTS

| | | | |
|---|---|---|---|
| 3,058,908 A * | 10/1962 | Morgan | 210/603 |
| 3,978,176 A * | 8/1976 | Voegeli | 261/122.1 |
| 2009/0202304 A1 | 8/2009 | Koide et al. | |

FOREIGN PATENT DOCUMENTS

| | | |
|---|---|---|
| JP | A-2004-050167 | 2/2004 |
| JP | A-2005-342656 | 12/2005 |

(Continued)

OTHER PUBLICATIONS

Koide et al., "Carbon microbubbles sequestration: a novel technology for stable underground emplacement of greenhouse gases into wide variety of saline aquifers, fractured rocks and tight reservoirs," *Energy Procedia*, vol. 1, pp. 3655-3662, 2009.

(Continued)

*Primary Examiner* — David Bagnell
*Assistant Examiner* — Ronald Runyan
(74) *Attorney, Agent, or Firm* — Oliff PLC

(57) ABSTRACT

There are provided a carbon dioxide storage apparatus and a carbon dioxide storage method which, through direct injection of carbon dioxide into an underground brine aquifer, can store carbon dioxide efficiently in the brine aquifer. A filter formed of, for example, grindstone is provided at a tip portion of an injection well. A pumping apparatus pumps carbon dioxide stored in a carbon dioxide tank. The pumping apparatus feeds carbon dioxide from the carbon dioxide tank into the injection well by means of a pump. In the pumping apparatus, carbon dioxide is held within a predetermined pressure range and a predetermined temperature range. Carbon dioxide is fed through the injection well, and is injected into a brine aquifer. Carbon dioxide injected into the brine aquifer assumes the form of microbubbles.

4 Claims, 14 Drawing Sheets

(56) References Cited

FOREIGN PATENT DOCUMENTS

| | | | | |
|---|---|---|---|---|
| JP | A-2008-006367 | 1/2008 | | |
| JP | A-2008-019644 | 1/2008 | | |
| JP | A-2008-082023 | 4/2008 | | |
| JP | A-2010-524744 | 7/2010 | | |
| WO | WO 2008073765 A2 * | 6/2008 | ............. | E21B 43/16 |
| WO | WO 2010/018844 A1 | 2/2010 | | |

OTHER PUBLICATIONS

International Preliminary Report on Patentability issued in Application No. PCT/JP2010/063622; Dated Mar. 13, 2012.
International Search Report issued in Application No. PCT/JP2010/063622; Dated Nov. 2, 2010 (With Translation).
Office Action issued in Japanese Patent Application No. 2010-548303; Dated Jul. 2, 2013 (With translation).

* cited by examiner

DEVICE AND METHOD FOR SEQUESTERING A SUBSTANCE

TECHNICAL FIELD

The present invention relates to a device and method for sequestering (an apparatus and method for storing), in an underground brine aquifer, a substance-to-be-stored which includes at least one of carbon dioxide, a substance higher in water solubility than carbon dioxide, and methane, by means of injection of carbon dioxide into the brine aquifer.

BACKGROUND ART

At present, a reduction in emission of carbon dioxide, which is a greenhouse gas, into the atmosphere is urgent. In order to reduce carbon-dioxide emissions, in addition to a method for limiting the generation of carbon dioxide itself, a method for storing carbon dioxide underground has been studied.

An available method for storing carbon dioxide underground in as large an amount as one million tons per year is to inject carbon dioxide into a geological stratum. FIG. 13 shows a carbon-dioxide-storing apparatus 80. An injection well 87, which is a tubular body, is extended to a storage layer 91 where carbon dioxide is to be stored. Carbon dioxide stored in a carbon dioxide tank 81 is injected into the storage layer 91 via the injection well 87 by means of a pumping apparatus 83.

In this case, after injection of carbon dioxide into the storage layer 91, it is desirable that injected carbon dioxide does not exude above ground. Thus, as shown in FIG. 13, a seal layer 89 having an anticlinal structure (upwardly convex form) must be present above the storage layer 91. The seal layer 89 is a layer through which carbon dioxide is unlikely to penetrate; for example, an argillaceous layer.

The seal layer 89 prevents carbon dioxide injected into underground from exuding above ground. However, a geological formation having such an upwardly convex seal layer 89 is present only in limited locations; i.e., locations available for application of such a method are limited.

Therefore, there has been studied a method applicable to a location where the seal layer 89 is not of an anticlinal structure, but of a monoclinal structure; specifically, a method for efficiently storing carbon dioxide in groundwater through dissolution of carbon dioxide in formation water present in an underground brine aquifer.

An example of such a method is as follows: carbon dioxide is dispersed in the form of microbubbles in water or seawater, and the resultant water or seawater is dissolved in the sea, thereby disposing of microparticles of carbon dioxide hydrate on the bottom of the ocean (Patent Document 1).

According to another method, formation water is pumped up from an aquifer; carbon dioxide is injected into the water in the form of microbubbles; and the resultant gas-liquid mixed fluid is injected into the aquifer (Patent Document 2, Patent Document 3).

PRIOR ART DOCUMENTS

Patent Documents

Patent Document 1: Japanese Patent Application Laid-Open (kokai) No. 2004-50167
Patent Document 2: Japanese Patent Application Laid-Open (kokai) No. 2008-6367
Patent Document 3: Japanese Patent Application Laid-Open (kokai) No. 2008-19544

SUMMARY OF THE INVENTION

Problems to be Solved by the Invention

However, the method described in Patent Document 1, in which carbon dioxide gas is formed into microbubbles and then hydrated for storage in the form of hydrate particles in the ocean, involves the following problem. Generally, a high pressure in excess of 10 MPa is required for hydrating carbon dioxide having a temperature slightly above 10° C. Thus, utilization of the method can be said to be limited to an environment having a temperature of 10° C. or lower. In an environment having a higher temperature, the method encounters difficulty in efficiently storing carbon dioxide.

A conventional method which uses a swirling-flow generator or the like involves a problem in that apparatus is complicated. In order to generate microbubbles in an underground environment, a simpler structure is required.

According, to the methods described in Patent Document 2 and Patent Document 3, formation water contained in an aquifer is once pumped up and is then formed into a gas-liquid mixed state, and the resultant gas-liquid mixed fluid is injected again into the aquifer. Thus, the methods involve the following problems. In addition to an injection well, a lifting well for pumping up formation water therethrough and a lifting pump are required. Accordingly, the entire system becomes extensive, and motive power required for storage increases. Further, injection pressure into the aquifer must be balanced with suction pressure in the lifting well, and a lifting rate and an injection rate must coincide with each other, resulting in a failure to effectively store carbon dioxide.

As mentioned above, locations available for underground storage of substance, such as carbon dioxide, are limited. For example, storage in an excessively shallow location is undesirable, since stored substance may affect water for human use.

Meanwhile, in the case of injection of substance-to-be-stored into a deeper location (e.g., a depth of 800 m or more), the stored substance does not affect water for human use, and the pressure at the deeper location enables the stored substance to be brought into a supercritical state, which enables an increase in storage efficiency. However, deep locations available for storage of substance are limited. Also, such storage involves an increase in man-hours for installing an injection well, etc.

Thus, if substance can be stored at a shallow depth (400 m to 600 m) without affecting water for human use, the range of storage-location selection can be expanded. However, storage in such a shallow location encounters difficulty in injecting substance-to-be-stored in a supercritical state because of the pressure at the shallow location; i.e., substance-to-be-stored is injected in a gaseous or liquid state. Thus, a method for efficiently storing substance in a gaseous or liquid state is demanded.

Means for Solving the Problems

The present invention has been conceived in view of the above problems, and an object of the present invention is to provide a device and method for sequestering a substance-to-be-stored underground which injects a substance-to-be-stored, such as carbon dioxide, directly into a relatively shallow underground brine aquifer and can store the substance efficiently in the brine aquifer.

To achieve the above object, a first aspect of the present invention provides a device for underground storage of a substance-to-be-stored comprising an injection well extending to a brine aquifer; a pumping apparatus for pumping to the injection well a substance-to-be-stored which includes at least one of carbon dioxide, a substance higher in water solubility than carbon dioxide, and methane; and a porous member provided in the vicinity of a tip of the injection well. The substance-to-be-stored pumped into the injection well can be injected into the brine aquifer via the porous member. In the course of injection of the substance-to-be-stored from the porous member into the brine aquifer, microbubbles of the substance-to-be-stored are generated.

Preferably, the porous member is formed through firing of a mixture of ceramic particles and a binder for binding the ceramic particles together; a mode of a pore size distribution is 40 μm or less; and a full width at half maximum of the pore size distribution is 10 μm or less.

The porous member may be a grindstone. The substance-to-be-stored injected from the porous member into the brine aquifer may be in a liquid state, a gaseous state, or a mixed state thereof.

According to the first aspect of the present invention, the porous member is provided at a tip portion of the injection well through which a substance-to-be-stored, such as carbon dioxide, is injected, and, when the substance-to-be-stored passes through the porous member, microbubbles of the substance-to-be-stored are generated. Thus, the substance-to-be-stored can be dissolved efficiently in formation water present in a brine aquifer.

By use of the porous member formed through firing of a mixture of ceramic particles and a binder for binding the ceramic particles together and having a mode of a pore size distribution of 40 μm or less and a full width at half maximum of the pore size distribution of 10 μm or less, the substance-to-be-stored can be dissolved more efficiently in a brine aquifer. Such a porous member can be formed through firing of a mixture of a binder and ceramic particles having a 50% cumulative particle size of 40 μm or less and an error of 2.5 μm or less in the 50% cumulative particle size. By use of such a porous member, microbubbles can be generated more reliably. A vitrified grindstone formed of fine particles for precision grinding can be used to form such a porous member. Notably, a full width at half maximum of a pore size distribution indicates the following. In a pore size distribution curve of a subject substance expressed by plotting a differential pore volume distribution along the vertical axis and a pore size (logarithm of pore size) along the horizontal axis, a full width at half maximum of a pore size distribution indicates a width between two pore sizes at half of the maximum value of the differential pore volume distribution.

Since a substance-to-be-stored can be injected from the porous member into a brine aquifer in a gaseous state, a liquid state, or a mixed state thereof, there is no need to bring the substance-to-be-stored into a special state, such as a supercritical state. Thus, the substance can be stored in a relatively shallow underground location. Therefore, few limitations are imposed on storage locations. Microbubbles indicate bubbles or liquid droplets each having a diameter of less than 1 mm.

By means of pumping up petroleum oil or the like from a gas field or the like by use of a production well and injecting into a brine aquifer a mixture of a substance-to-be-stored, and water which has been pumped up with oil or the like, enhanced recovery of oil or the like can be performed while storing the substance underground. In this case, the substance-to-be-stored is injected into a gas field, an oil field, or oil sand, whereby microbubbles of the substance-to-be-stored, and gas, petroleum oil, or heavy oil can be brought into a state of solution or suspension.

A second aspect of the present invention provides a method for sequestering of a substance-to-be-stored in a brine aquifer comprising the steps of providing a porous member in the vicinity of a tip of an injection well extending to the brine aquifer; and injecting the substance-to-be-stored into the brine aquifer via the porous member to thereby generate microbubbles of the substance-to-be-stored. The porous member is formed through firing of a mixture of ceramic particles and a binder for binding the ceramic particles together. The porous member has a mode of a pore size distribution of 40 μm or less and a full width at half maximum of the pore size distribution of 10 μm or less.

According to the second aspect of the present invention, the porous member is provided at a tip portion of the injection well adapted to inject a substance-to-be-stored, such as carbon dioxide, therethrough. The porous member is formed through firing of a mixture of ceramic particles and a binder for binding the ceramic particles together. The porous member has a mode of a pore size distribution of 40 μm or less and a full width at half maximum of the pore size distribution of 10 μm or less. Thus, the substance-to-be-stored which passes through the porous member is formed into microbubbles. Therefore, the substance-to-be-stored can be dissolved efficiently in a brine aquifer. In this case, the substance-to-be-stored may be in a gaseous state, a liquid state, or a mixed state thereof; i.e., the substance-to-be-stored does not need to be in a special state, such as a supercritical state. Accordingly, the substance-to-be-stored can be stored even when the storage depth is relatively shallow.

Effect of the Invention

The present invention can provide a device and method for sequestering a substance-to-be-stored which injects a substance-to-be-stored, such as carbon dioxide, directly into a relatively shallow underground brine aquifer and can store the substance efficiently in the brine aquifer.

BEST MODE FOR CARRYING OUT THE INVENTION

Figure 1:
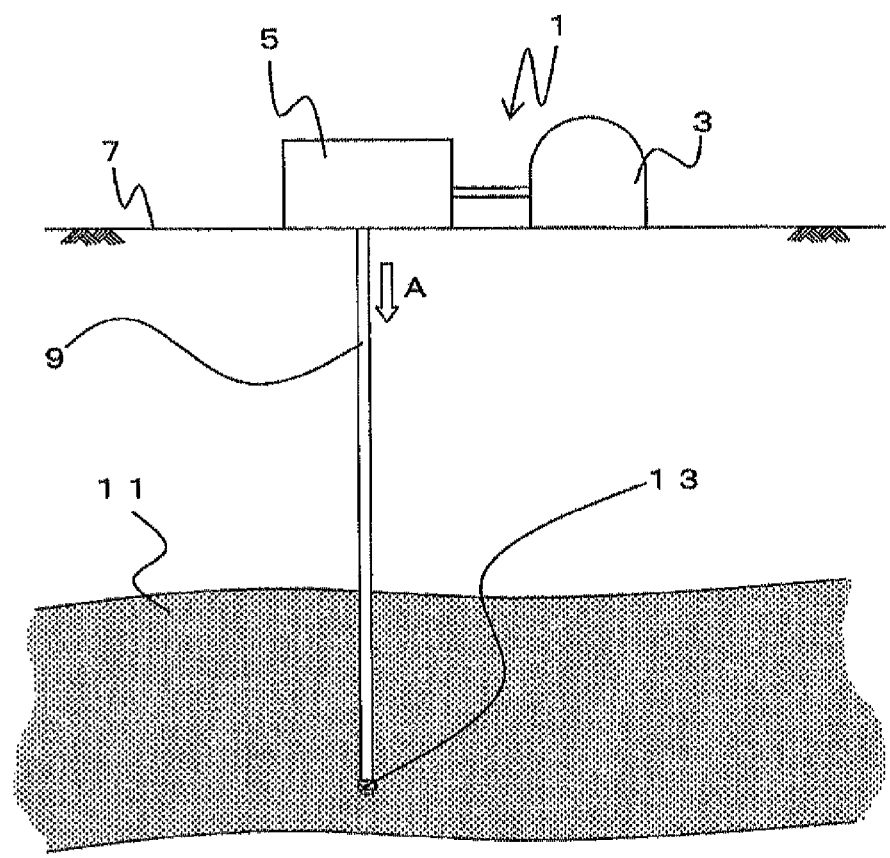
FIG. 1 is a view showing a carbon dioxide storage apparatus 1.

An embodiment of the present invention will next be described in detail with reference to the drawings. FIG. 1 shows a carbon dioxide storage apparatus 1 according to the present embodiment. The carbon dioxide storage apparatus 1 includes a carbon dioxide tank 3, a pumping apparatus 5, an injection well 9, and a filter 13. The present embodiment is described while mentioning carbon dioxide as a substance-to-be-stored. However, the same is applied to acetylene, ammonia, sulfur dioxide, hydrogen chloride, chlorine, and hydrogen sulfide, which are higher in water solubility than carbon dioxide, as well as flare gas, such as methane.

Carbon dioxide emitted from a factory or the like is collected and stored in the carbon dioxide tank 3. In the case where a carbon dioxide source is adjacent to the carbon dioxide tank 3, the carbon dioxide source and the carbon dioxide tank 3 may be directly connected to each other through piping for storage.

The carbon dioxide tank 3 is connected to the pumping apparatus 5. The pumping apparatus 5 includes an unillustrated pump, a pressure regulation valve, another valve, and a temperature regulator. The injection well 9, which is a tubular body, is joined to the pumping apparatus 5. The injection well 9 extends down a ground surface 7 to a brine aquifer 11. The brine aquifer 11 is an underground layer of sand, gravel, etc. An unillustrated seal layer (so-called cap rock) is present above the brine aquifer 11.

The filter 13, which is a porous member, is provided at a tip portion of the injection well 9. The filter 13 is a member formed through firing of, for example, a mixture of ceramic particles and a binder for binding the ceramic particles together. The finer the pore size of the filter 13, the more readily microbubbles can be generated. However, since the passage resistance of fluid increases, the pumping apparatus 5 increases in size for increasing the flow rate of carbon dioxide. Increasing the pore size of the filter 13 lowers the passage resistance of fluid; however, the efficiency of generation of microbubbles drops. The filter 13 can have a pore size of, for example, 20 μm to 40 μm.

Preferably, the filter 13 is formed of a porous member having a mode of a pore size distribution of 40 μm or less and a pore size variation (full width at half maximum) of 10 μm or less. Such a porous member is formed of ceramic particles having a 50% cumulative particle size of 40 μm or less and an error of 2.5 μm or less in the 50% cumulative particle size. Such a porous member is of, for example, a vitrified grindstone formed through firing of a mixture of the above-mentioned particles and a binder (grindstone of #320 or higher specified by JIS mentioned below).

A cumulative particle size of particles and an error in particle size are as specified in "4. Particle Size Distribution" in The Japanese Industrial Standards JIS R6001:1998 and in "8. Electric Resistance Test Method" in JIS R6002:1998 (ISO 8486-1:1996 and ISO 8486-2:1996). The pore size of the filter 13 is measured by use of a mercury porosimeter specified in JIS R1655:2003.

Carbon dioxide stored in the carbon dioxide tank 3 is pumped by means of the pumping apparatus 5. The pumping apparatus 5 pumps carbon dioxide from the carbon dioxide tank 3 into the injection well 9. At this time, by means of the pressure regulation valve, the temperature regulator, etc., the pumping apparatus 5 can pump carbon dioxide at a predetermined pressure and a predetermined temperature.

The pumping apparatus 5 can pump carbon dioxide in, for example, a supercritical state. However, the carbon dioxide storage apparatus 1 can yield a similar effect even when carbon dioxide is in a gaseous state, a liquid state, or a mixed state thereof. For example, carbon dioxide is pumped at a temperature of 20° C. to 40° C. under a pressure of 2 MPa to 8 MPa. These pumping conditions are suited for storage of carbon dioxide at a depth of, for example, 200 m to 800 m. Carbon dioxide under these conditions is transferred through the injection well 9 in the direction of arrow A; passes through the filter 13 provided at an end portion of the injection well 9; and is injected into the brine aquifer 11.

Figure 2:
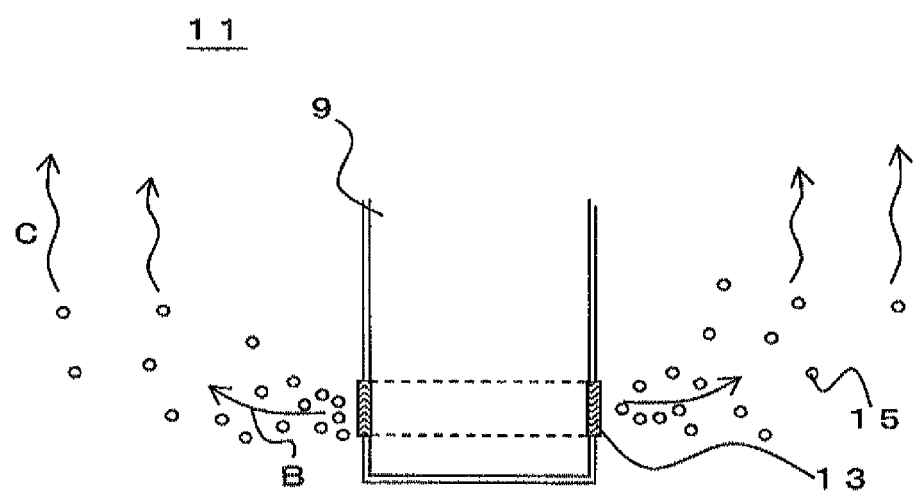
FIG. 2 is an enlarged view showing a filter 13 and its periphery.

FIG. 2 is a sectional view showing a tip portion and its vicinity of the injection well 9. The filter 13 in a ring shape is provided on a side surface of the injection well 9 in the vicinity of the lower end of the injection well 9. The lower end (bottom) of the injection well 9 is closed; thus, carbon dioxide flowing through the injection well 9 is injected into the brine aquifer 11 from the filter 13. When carbon dioxide which has passed through the injection well 9 passes through the filter 13 and is injected into the surrounding brine aquifer 11, carbon dioxide is formed into microbubbles by the effect of the filter 13.

When and after carbon dioxide is injected in the form of microbubbles into the brine aquifer 11; i.e., in the course of injection (arrow B in FIG. 2) and subsequent ascent (arrow C in FIG. 2), carbon dioxide is dissolved in the brine aquifer 11. By virtue of formation into microbubbles, the residence time in the brine aquifer 11 of carbon dioxide becomes long (since the ascending speed of microbubbles 15 in the brine aquifer 11 is very slow). Also, since a contact area of carbon dioxide with the brine aquifer 11 per unit amount of carbon dioxide can be increased, the dissolution of carbon dioxide in the brine aquifer 11 can progress quite efficiently.

While moving slowly in the brine aquifer 11, carbon dioxide is dissolved in the brine aquifer 11 and chemically reacts with minerals, etc., present around the brine aquifer 11, thereby forming compounds, such as carbonate. Therefore, carbon dioxide can not only be stored in a brine aquifer, but also be fixed in the form of carbonate compounds underground and under the bottom of sea.

Figure 3:
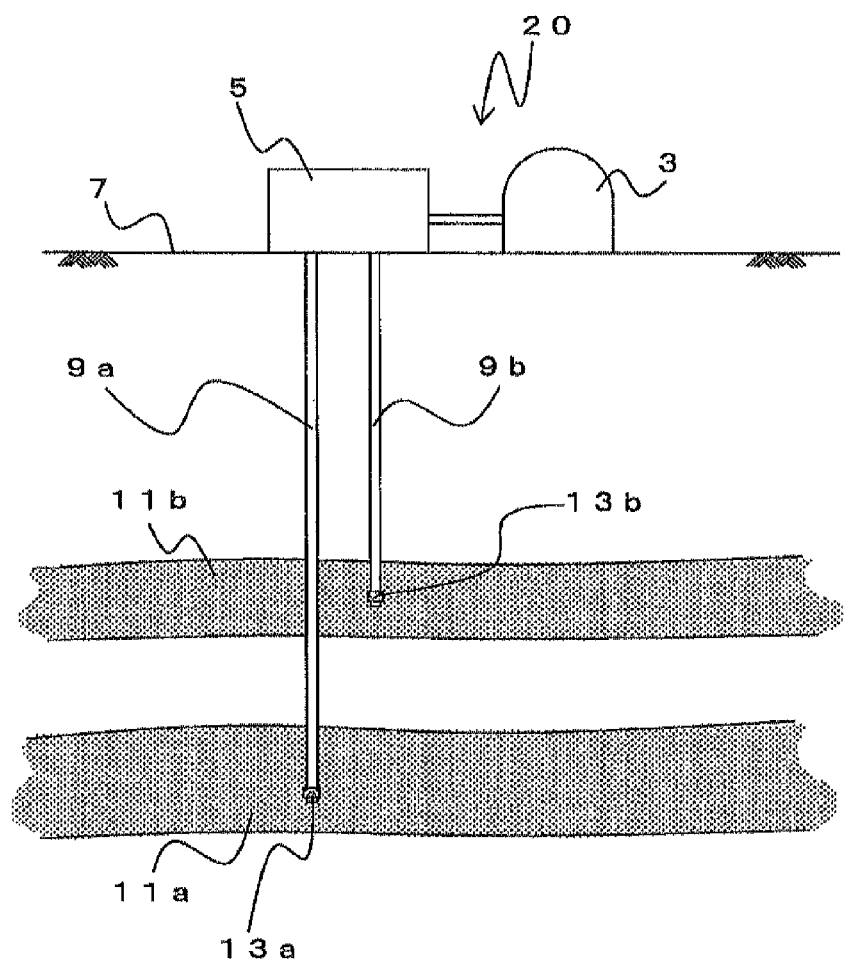
FIG. 3 is a view showing a carbon dioxide storage apparatus 20.

Next, a method for underground storage of carbon dioxide according to another embodiment of the present invention will be described. FIG. 3 shows a carbon dioxide storage apparatus 20. In the following description of the present embodiment, constituent elements similar in function to those of the carbon dioxide storage apparatus 1 shown in FIG. 1 are denoted by like reference numerals, and redundant description thereof is omitted.

The carbon dioxide storage apparatus 20 differs from the carbon dioxide storage apparatus 1 in that a plurality of injection wells 9a and 9b are provided. In the case of alternating sandstone-mudstone layers in which a mudstone layer, whose permeability is low, and a sandstone layer, whose permeability is high, are present alternatingly, the injection wells 9a and 9b are provided in such a manner as to extend to respective sandstone layers where brine aquifers 11a and 11b are present. The carbon dioxide storage apparatus 20 can inject carbon dioxide into the brine aquifers 11a and 11b through the injection wells 9a and 9b simultaneously or individually. Therefore, carbon dioxide can be injected efficiently into the brine aquifers 11a and 11b.

Figure 4:
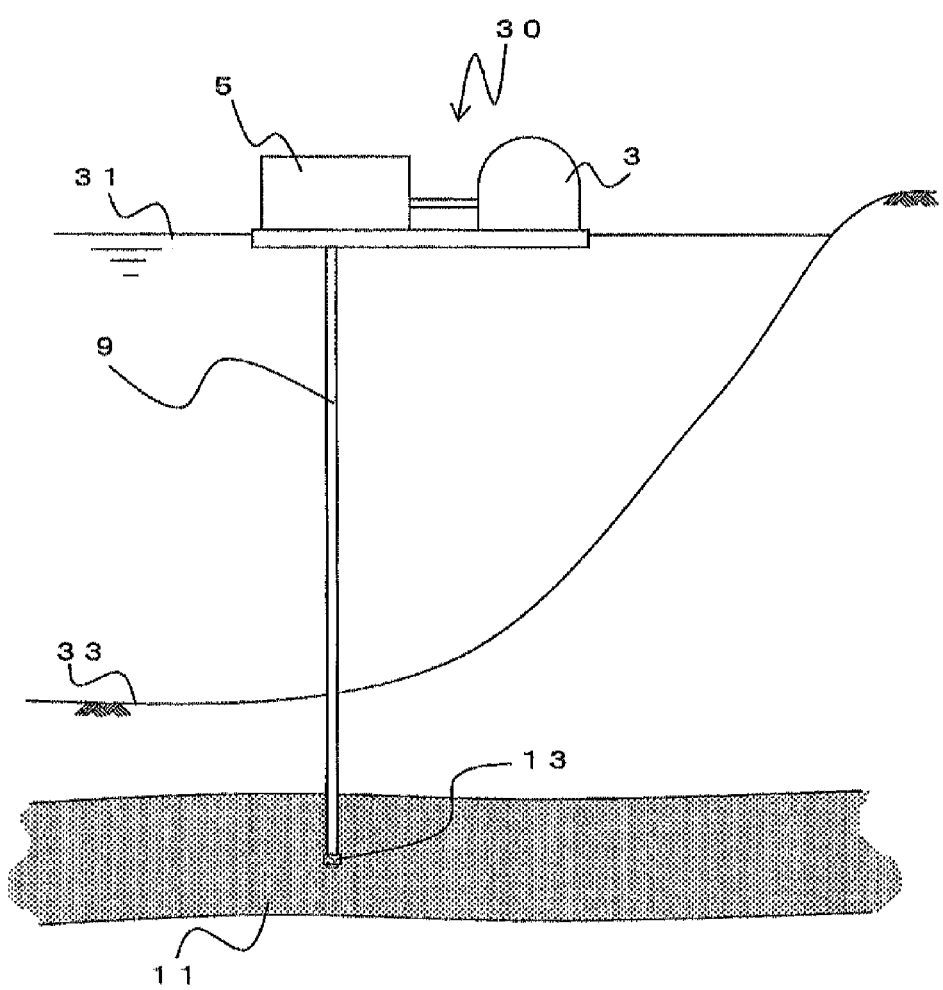
FIG. 4 is a view showing a carbon dioxide storage apparatus 30.

FIG. 4 shows a carbon dioxide storage apparatus 30. The carbon dioxide storage apparatus 30 differs from the carbon dioxide storage apparatus 1 in that the carbon dioxide storage apparatus 30 is disposed on a sea surface 31. In order to store carbon dioxide efficiently into the brine aquifer 11 under a sea bottom 33, the carbon dioxide storage apparatus 30 is provided on the sea surface 31. The carbon dioxide storage apparatus 30 can store carbon dioxide efficiently into the brine aquifer 11 under the sea bottom 33. A ship is used as means for transporting carbon dioxide to the carbon dioxide tank 3. The carbon dioxide tank 3 can be replenished with carbon dioxide directly from the ship.

EXAMPLE

Figure 5:
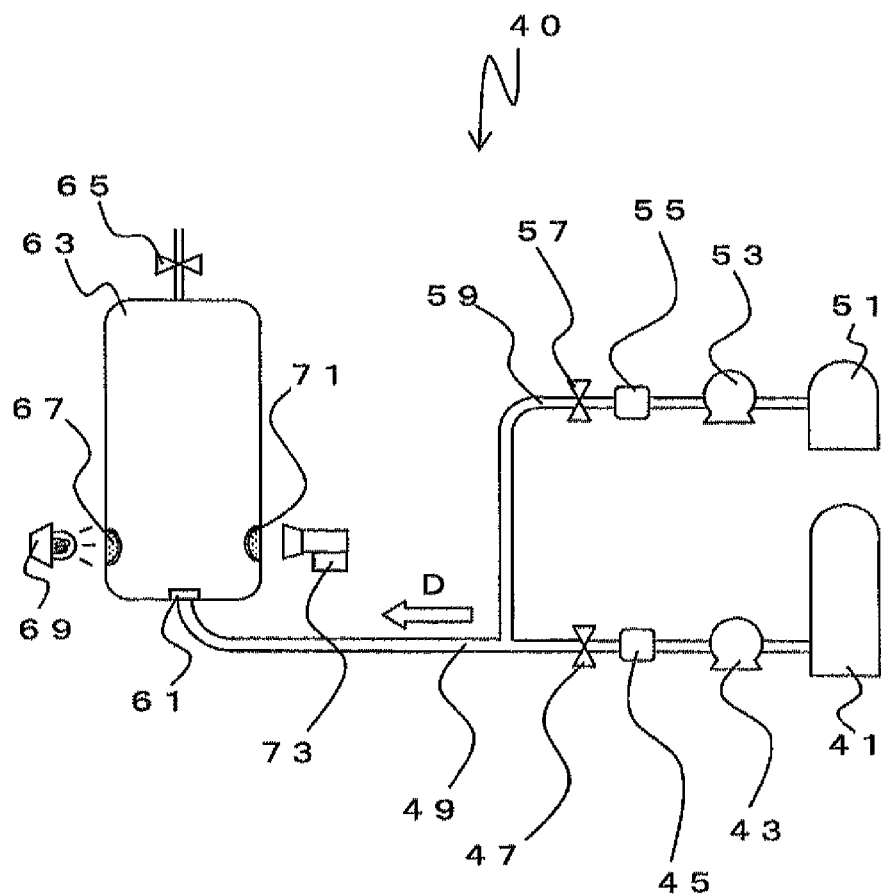
FIG. 5 is a view showing a carbon dioxide storage test apparatus 40.

The method for storing a substance-to-be-stored underground according to the present invention was verified for a state of generation of microbubbles. FIG. 5 shows a carbon dioxide storage test apparatus 40.

The carbon dioxide storage test apparatus 40 includes a carbon dioxide tank 41, pressure regulation valves 45 and 55, a water tank 51, syringe pumps 43 and 53, and a pressure vessel 63.

Carbon dioxide is stored in the carbon dioxide tank 41. The syringe pump 43, the pressure regulation valve 45, and a valve 47 are connected to the carbon dioxide tank 41 by means of piping 49. The syringe pump 43 pumps carbon dioxide to the pressure vessel 63. Carbon dioxide can be regulated in pressure to an arbitrary value by means of the pressure regulation valve 45. Also, carbon dioxide to be pumped to the pressure vessel 63 can be regulated in temperature to an arbitrary value by means of an unillustrated temperature regulator.

The water tank 51 contains water. The syringe pump 53, the pressure regulation valve 55, and a valve 57 are connected to the water tank 51 by means of piping 59. The syringe pump 53 pumps water to the pressure vessel 63. Similar to carbon dioxide, water can be regulated in pressure to an arbitrary value by means of the pressure regulation valve 55. Also, water to be pumped to the pressure vessel 63 can be regulated in temperature to an arbitrary value by means of an unillustrated temperature regulator.

The piping 59 is joined to the piping 49. Thus, through operation of the valves 47 and 57, carbon dioxide alone or a mixture of carbon dioxide and water can be pumped to the pressure vessel 63 (direction of arrow D in FIG. 5).

A filter 61 is provided at a joint between the pressure vessel 63 and the piping 49. The filter 61 assumes the form of a disk having a diameter of 50 mm and a thickness of 5 mm. The filter 61 can be replaced, so that a test can be conducted while pore sizes are changed.

The pressure vessel 63 has a lighting window 67 and a photographing window 71 provided at opposite sides. The lighting window 67 and the photographing window 71 are transparent windows, so that the conditions of the interior of the pressure vessel 63 can be checked therethrough. An externally disposed lighting 69 illuminates the interior of the pressure vessel 63 through the lighting window 67. A camera 73 is disposed externally of the photographing window 71 located opposite the lighting window 67. The camera 73 can photograph the interior of the pressure vessel 63 illuminated by the lighting 69. The camera 73 is a high-speed camera and provides images showing the conditions of carbon dioxide injected through the filter 61 into the pressure vessel 63.

The pressure vessel 63 is filled with water under a predetermined pressure. The pressure vessel 63 has a release valve 65. The release valve 65 functions to hold the interior of the pressure vessel 63 at a constant pressure even when carbon dioxide or the like is injected into the pressure vessel 63. Specifically, when injected carbon dioxide or the like causes an increase in pressure, water or the like is released from the pressure vessel 63 so as to bring the increased pressure to a regular level. Water in the pressure vessel 63 is a simulated brine aquifer.

By use of the carbon dioxide storage test apparatus 40, the conditions of carbon dioxide injected under various conditions into the pressure vessel 63 were observed. Carbon dioxide to be injected in the pressure vessel 63 was in a liquid state, a gaseous state, and a mixed state thereof. Stainless steel sintered filters having pore sizes (nominal) of 20 μm and 40 μm and vitrified grindstones having pore sizes (nominal) of 28 μm and 40 μm were used as the filter 61. The stainless steel sintered filter having a pore size (nominal) of 40 μm and the vitrified grindstones having pore sizes (nominal) of 28 μm and 40 μm were measured for pore size distribution by use of a fully automatic pore size distribution measuring device (PoreMaster 60-GT, product of Quantachrome Instruments). The results of measurement are shown in Table 1

TABLE 1

| | Median μm | Mode μm | Full width at half maximum μm |
|---|---|---|---|
| 40 μm SUS sintered filter | 37.9 | 38.4 | 18 |
| 28 μm vitrified grindstone | 17.3 | 17.8 | 6 |
| 40 μm vitrified grindstone | 30.0 | 28.5 | 9 |

Figure 6:
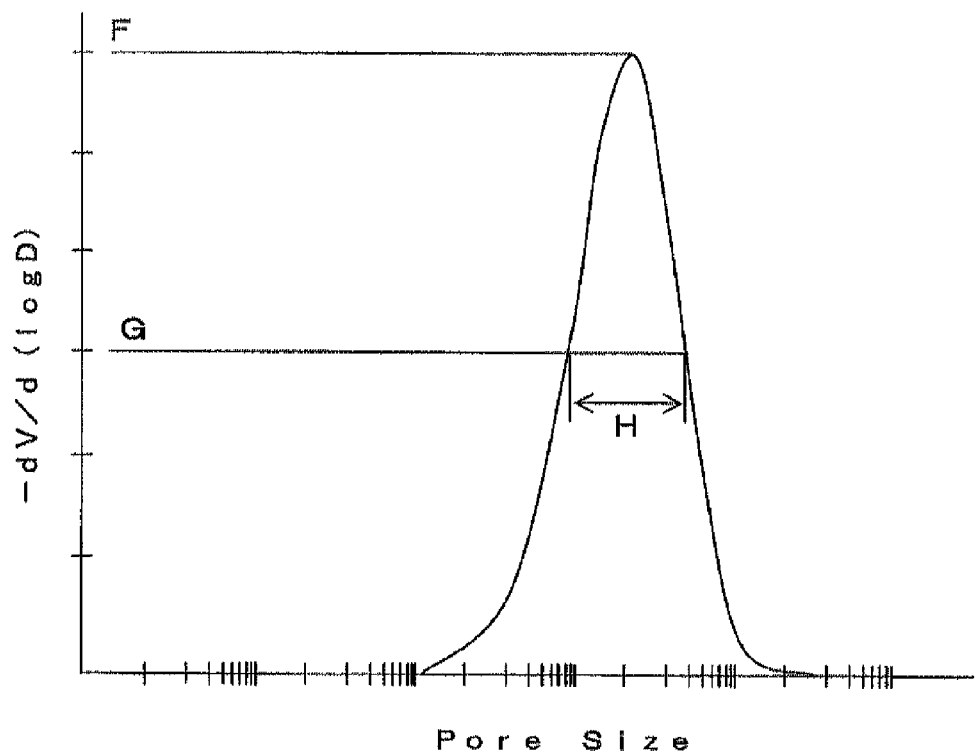
FIG. 6 is a graph showing a pore size distribution.

As shown in Table 1, the vitrified grindstones have pore sizes slightly smaller than nominal sizes. Particularly, as compared with the stainless steel sintered filter, the vitrified grindstones are considerably smaller in full width at half maximum. That is, the vitrified grindstones are small in pore size variation; in other words, the vitrified grindstones are superior in pore size uniformity to the stainless steel sintered filter. Notably, a full width at half maximum of a pore size distribution indicates the following. In a pore size distribution curve of a subject substance expressed by plotting a differential pore volume distribution along the vertical axis and a pore size (logarithm of pore size) along the horizontal axis, a full width at half maximum of a pore size distribution indicates a width between two pore sizes at half of the maximum value of the differential pore volume distribution. FIG. 6 schematically shows a pore size distribution. As shown in FIG. 6, a pore size distribution can be obtained by plotting a differential pore volume distribution (−dV/d (log D)) along the vertical axis and a pore size along the horizontal axis. In view of measuring-point variation and the logarithmic plotting of pore size, the differential pore volume distribution is a value obtained by dividing a differential pore volume dV, which is a pore volume for each pore size, by a differential value d (log D) of logarithmic pore size. The full width at half maximum in the example shown in FIG. 6 is a distribution width H of a distribution curve at half G of maximum differential pore volume distribution F of the distribution curve. By use of vitrified grindstone, pore size variation (full width at half maximum) can be rendered substantially 10 μm or less. In order to attain such a pore size variation, particles of ceramic (alumina or titanium oxide) having a 50% cumulative particle size of 40 μm or less and an error of 2.5 μm or less in the 50% cumulative particle size were used. The employed vitrified grindstones are alumina grindstones produced by Matsunaga Stone Co., Ltd.

Figure 7A:
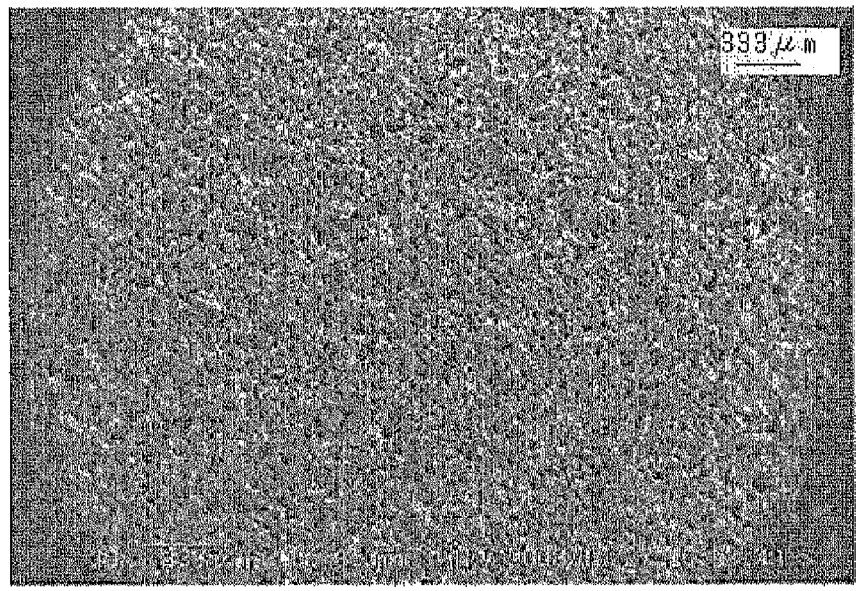
FIG. 7(a) is a scanning electron micrograph showing the surface of a vitrified grindstone filter.
Figure 7B:
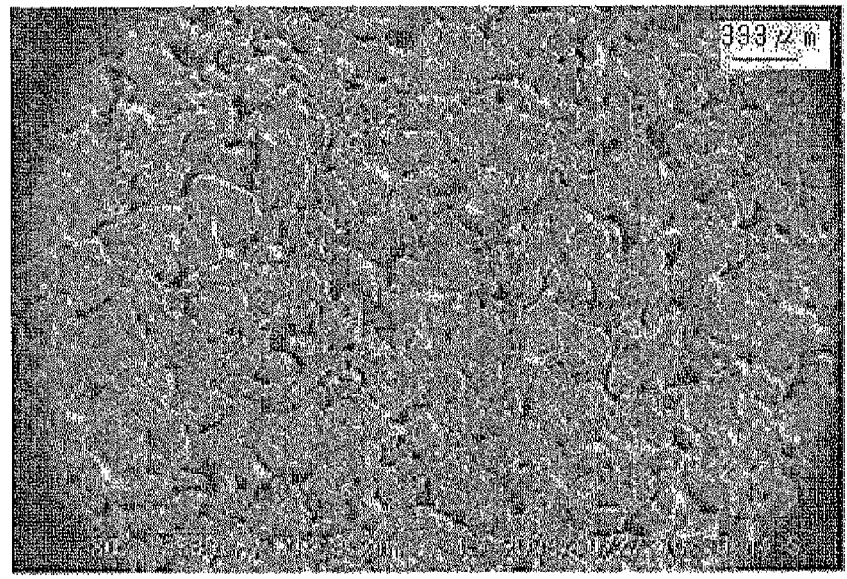
FIG. 7(b) is a scanning electron micrograph showing the surface of a stainless steel filter.

FIG. 7(a) is a photograph of the surface of the vitrified grindstone having a pore size of 40 μm according to the present invention. FIG. 7(b) is a photograph of the surface of the stainless steel sintered filter having a pore size of 40 μm. As mentioned above, even in the case of the same pore size (nominal), the vitrified grindstone is smaller in pore size variation as compared with the stainless steel sintered filter. This is because the vitrified grindstone is small in particle size variation (2.5 μm or less).

The test also used a vitrified grindstone having a pore size of 12 μm in addition to the aforementioned vitrified grindstones. The vitrified grindstone has a median of a pore size distribution of 4.87 μm and a mode of the pore size distribution of 4.63 μm. That is, the mode of the pore size distribution of the grindstone is smaller than those of the grindstones having pore sizes of 28 μm and 40 μm. Also, the vitrified grindstone has a full width at half maximum of the pore size distribution of 2.0 μm. Similar to the aforementioned vitrified grindstones, the vitrified grindstone satisfies the following conditions: the mode of a pore size distribution is 40 μm or less, and the full width at half maximum of the pore size distribution is 10 μm or less.

In addition to carbon dioxide alone, a mixture of carbon dioxide and water was also checked for conditions of the mixture injected into the pressure vessel 63.

Table 2 shows test conditions and results. In Table 2, "flow rate," "temperature," and "pressure" indicate the flow rate, temperature, and pressure of carbon dioxide to be injected into the pressure vessel. In tests Nos. 1 to 12 and 19 to 24, carbon dioxide is in a gaseous state. In tests Nos. 13 to 18, carbon dioxide is in a liquid state or a mixed state of liquid and gas. In the column "filter type," "SUS sintered" indicates a stainless steel sintered filter, and "grindstone" indicates a vitrified grindstone. In the column "filter," values indicate pore sizes (nominal) of filters.

Test Nos. 29 to 34 of Table 2 show the results of tests conducted under the following conditions: carbon dioxide is in a gaseous state, and the pressure vessel is filled with seawater. The column "seawater concentration" indicates the seawater concentration of water contained in the pressure vessel.

A pressure of 4 MPa is selected assuming storage at a depth of 400 m, and a pressure of 6 MPa is selected assuming storage at a depth of 600 m.

TABLE 2

| Test No. | | Flow rate ml/min | Temp. °C. | Pressure MPa | Seawater conc. % | Filter type | Filter μm | Generation of microbubbles |
|---|---|---|---|---|---|---|---|---|
| 1 | Present invention | 1.0 | 20 | 4 | — | Grindstone | 28 | Excellent |
| 2 | Present invention | 5.0 | 20 | 4 | — | Grindstone | 28 | Excellent |
| 3 | Present invention | 10.0 | 20 | 4 | — | Grindstone | 28 | Excellent |
| 4 | Present invention | 1.0 | 20 | 4 | — | Grindstone | 40 | Excellent |
| 5 | Present invention | 5.0 | 20 | 4 | — | Grindstone | 40 | Excellent |
| 6 | Present invention | 10.0 | 20 | 4 | — | Grindstone | 40 | Excellent |
| 7 | Present invention | 1.0 | 40 | 4 | — | Grindstone | 28 | Excellent |
| 8 | Present invention | 5.0 | 40 | 4 | — | Grindstone | 28 | Excellent |
| 9 | Present invention | 10.0 | 40 | 4 | — | Grindstone | 28 | Excellent |
| 10 | Present invention | 1.0 | 40 | 4 | — | Grindstone | 40 | Excellent |
| 11 | Present invention | 5.0 | 40 | 4 | — | Grindstone | 40 | Excellent |
| 12 | Present invention | 10.0 | 40 | 4 | — | Grindstone | 40 | Excellent |
| 13 | Present invention | 1.0 | 20 | 6 | — | Grindstone | 28 | Excellent |
| 14 | Present invention | 5.0 | 20 | 6 | — | Grindstone | 28 | Excellent |
| 15 | Present invention | 10.0 | 20 | 6 | — | Grindstone | 28 | Excellent |
| 16 | Present invention | 1.0 | 20 | 6 | — | Grindstone | 40 | Excellent |
| 17 | Present invention | 5.0 | 20 | 6 | — | Grindstone | 40 | Excellent |
| 18 | Present invention | 10.0 | 20 | 6 | — | Grindstone | 40 | Excellent |
| 19 | Present invention | 1.0 | 40 | 6 | — | Grindstone | 28 | Excellent |
| 20 | Present invention | 5.0 | 40 | 6 | — | Grindstone | 28 | Excellent |
| 21 | Present invention | 10.0 | 40 | 6 | — | Grindstone | 28 | Excellent |
| 22 | Present invention | 1.0 | 40 | 6 | — | Grindstone | 40 | Excellent |

TABLE 2-continued

| Test No. | | Flow rate ml/min | Temp. °C. | Pressure MPa | Seawater conc. % | Filter type | Filter μm | Generation of microbubbles |
|---|---|---|---|---|---|---|---|---|
| 23 | Present invention | 5.0 | 40 | 6 | — | Grindstone | 40 | Excellent |
| 24 | Present invention | 10.0 | 40 | 6 | — | Grindstone | 40 | Excellent |
| 25 | Comparative example | 2.0 | 24 | 5 | — | SUS sintered | 40 | Fair |
| 26 | Comparative example | 2.0 | 24 | 8 | — | SUS sintered | 40 | Poor |
| 27 | Comparative example | 2.0 | 24 | 5 | — | SUS sintered | 20 | Poor |
| 28 | Comparative example | 2.0 | 24 | 8 | — | SUS sintered | 20 | Poor |
| 29 | Present invention | 0.1 | 40 | 6 | 50 | Grindstone | 12 | Excellent |
| 30 | Present invention | 1.0 | 40 | 6 | 50 | Grindstone | 12 | Excellent |
| 31 | Present invention | 5.0 | 40 | 6 | 50 | Grindstone | 12 | Excellent |
| 32 | Present invention | 0.1 | 40 | 6 | 100 | Grindstone | 12 | Excellent |
| 33 | Present invention | 1.0 | 40 | 6 | 100 | Grindstone | 12 | Excellent |
| 34 | Present invention | 5.0 | 40 | 6 | 100 | Grindstone | 12 | Excellent |

The state of generation of microbubbles was evaluated as follows. Even when bubbles or droplets (hereinafter, the term "bubbles" is used regardless of a gaseous state, a liquid state, or a mixed state thereof) each having a diameter of 1 mm or greater are included, the state of generation of microbubbles was credited with "excellent" on condition that a large amount of microbubbles each having a diameter of less than 1 mm were generated. Even when most of generated bubbles are 1 mm or greater in diameter, the state of generation of microbubbles was credited with "fair" on condition that microbubbles were slightly present. When all of generated bubbles had a diameter equal to or greater than 1 mm, the state of generation of microbubbles was credited with "poor."

In Table 2, as is apparent from comparison of tests Nos. 1 to 28, using a grindstone filter as the filter 61 (tests Nos. 1 to 24) exhibited excellent generation of microbubbles while the filter pore size, flow rate, and pressure were varied. By contrast, using a stainless steel sintered filter as the filter 61 (tests Nos. 25 to 28) exhibited no generation of microbubbles (generation of few microbubbles).

Figure 8A:
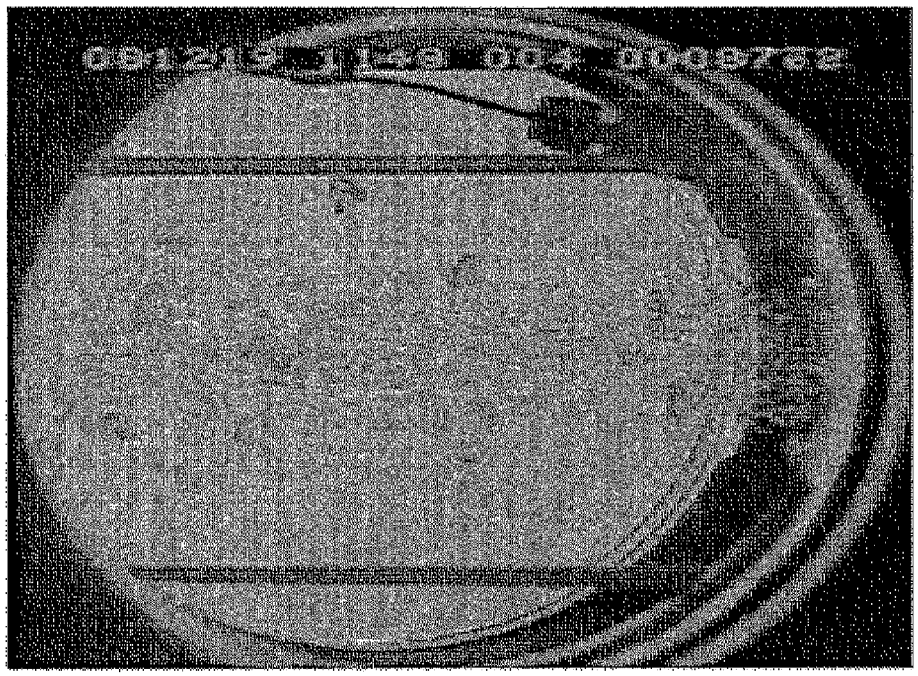
FIG. 8(a) is a photograph showing a state of generation of microbubbles 75.
Figure 8B:
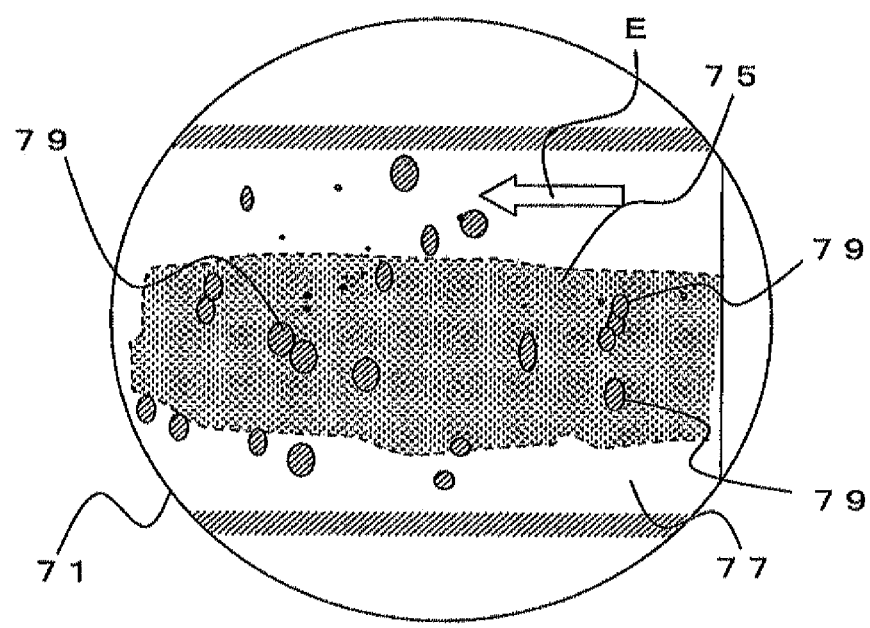
FIG. 8(b) is a schematic view showing the state of generation of the microbubbles 75.

FIGS. 8(a) and 8(b) show the state of generation of microbubbles in test No. 6. FIG. 8(a) shows an image photographed by the camera 73. FIG. 8(b) is a schematic view of FIG. 8(a). In FIGS. 8(a) and 8(b), the right side corresponds to the lower side of the pressure vessel 63, and the left side corresponds to the upper side of the pressure vessel 63.

As shown in FIG. 8(b), when carbon dioxide is injected from the lower side (right side in the drawing) of the pressure vessel 63, carbon dioxide is ejected into water contained in the pressure vessel 63 in the direction of arrow E. At this time, although some bubbles 79 were generated, the generation of very fine microbubbles 75 was confirmed. Some of the microbubbles 75 disappeared in the course of travel toward the left side in the drawing (toward the upper side of the pressure vessel 63). This indicates that carbon dioxide in the form of microbubbles was dissolved in water 77.

Figure 9A:
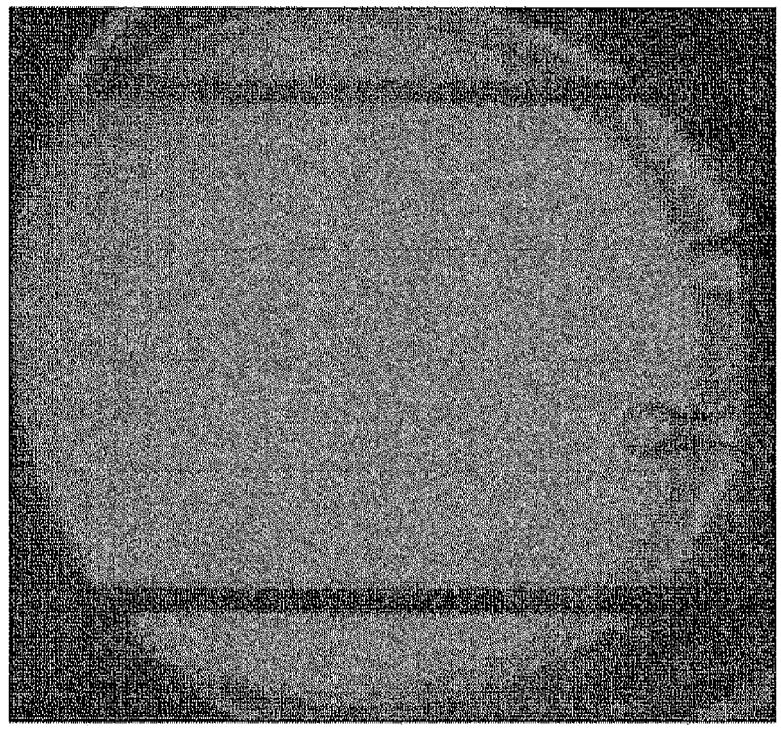
FIG. 9(a) is a photograph showing a state of generation of bubbles 79 without formation of microbubbles.
Figure 9B:
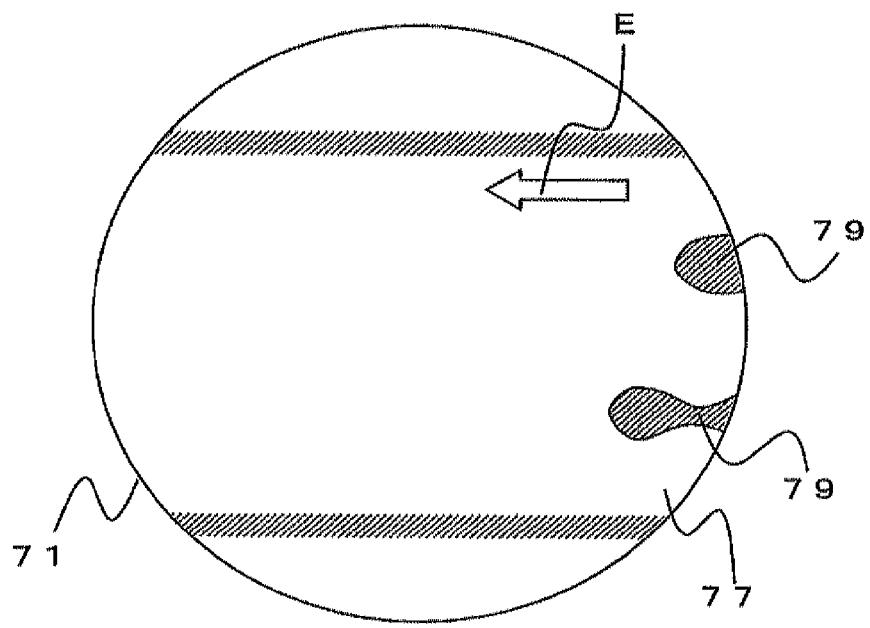
FIG. 9(b) is a schematic view showing the state of generation of the bubbles 79 without formation of microbubbles.

Similarly, FIGS. 9(a) and 9(b) show the condition of carbon dioxide in test No. 28. FIG. 9(a) shows an image photographed by the camera 73. FIG. 9(b) is a schematic view of FIG. 9(a). Arrow E in FIG. 9(b) indicates the direction of injection of carbon dioxide.

In the case of use of the stainless steel sintered filter, carbon dioxide was not injected into the water 77 in the form of microbubbles, but was injected in the form of large bubbles 79. Upon release from the filter 61, the bubbles 77 ascended immediately. Therefore, carbon dioxide was hardly dissolved in the water 77. This is because the stainless steel sintered filter is large in pore size variation as compared with the grindstone filter, so that carbon dioxide preferentially passes through large pores, resulting in limitation on generation of microbubbles.

Figure 10A:
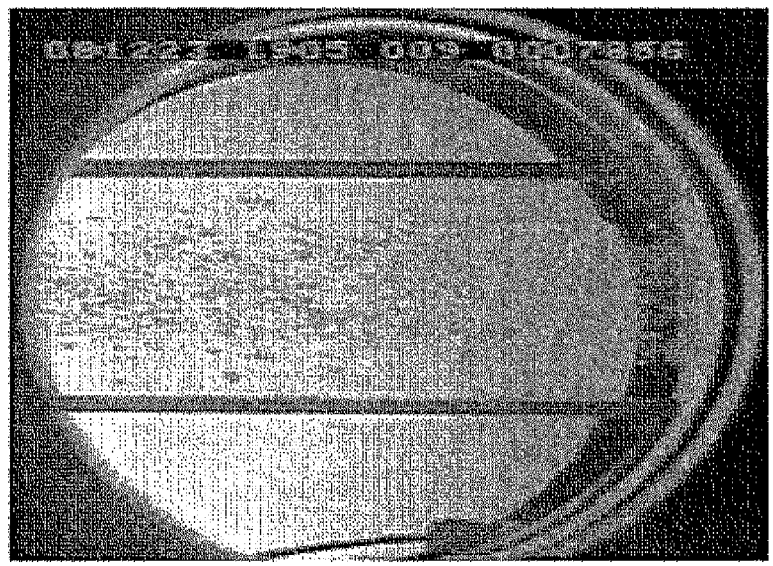
FIG. 10(a) is a photograph showing a state of generation of the microbubbles 75.
Figure 10B:
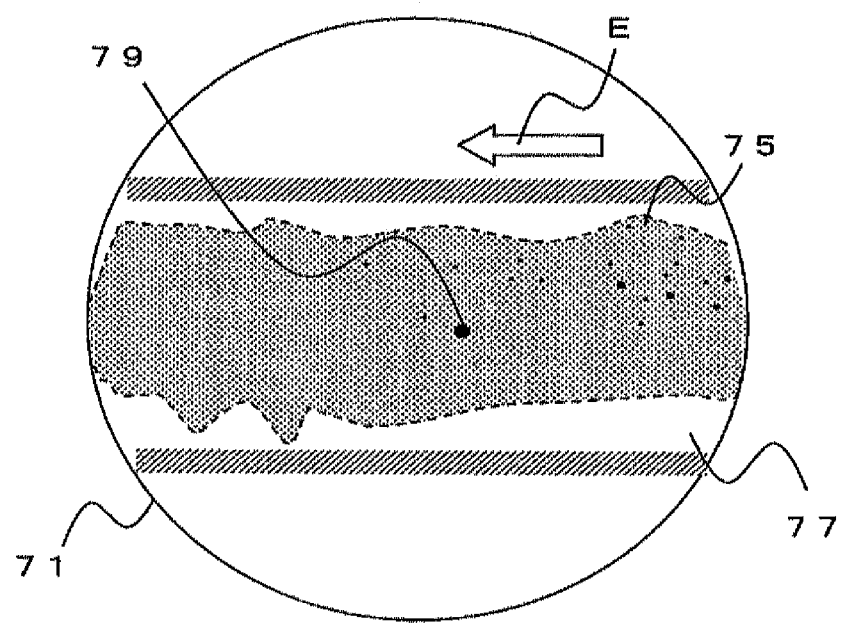
FIG. 10(b) is a schematic view showing the state of generation of the microbubbles 75.

FIGS. 10(a) and 10(b) show the state of generation of microbubbles in test No. 9. FIG. 10(a) shows an image photographed by the camera 73. FIG. 10(b) is a schematic view of FIG. 10(a).

As shown in FIG. 10(b), when carbon dioxide was injected in the direction of arrow E through the filter 61 having a pore size of 28 μm, the generation of microbubbles 75 far finer than in, for example, FIG. 8(b) was confirmed. The microbubbles 75 disappeared in the course of travel toward the left side in the drawing. This indicates that carbon dioxide in the form of microbubbles 75 was dissolved in water 77.

Figure 11A:
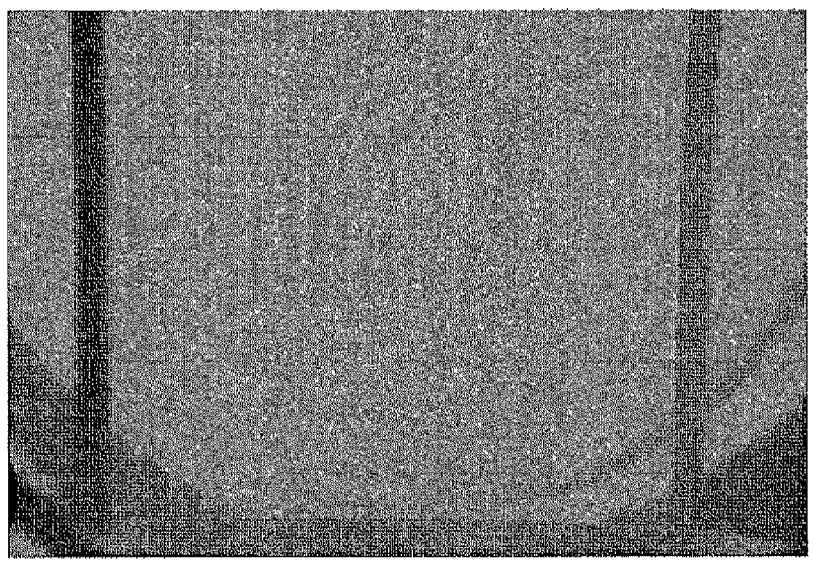
FIG. 11(a) is a photograph showing a state of generation of the microbubbles 75.
Figure 11B:
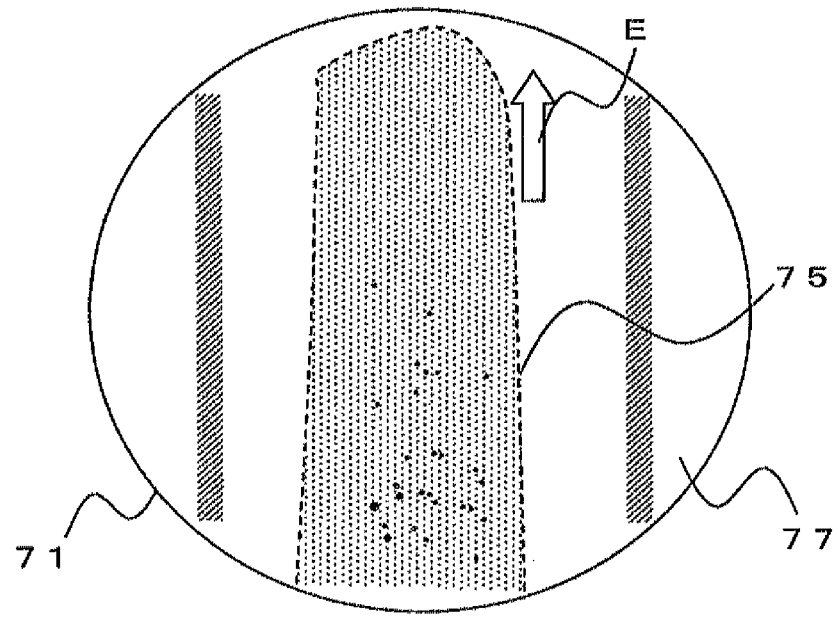
FIG. 11(b) is a schematic view showing the state of generation of the microbubbles 75.

Tests Nos. 29 to 34 were conducted while the pressure vessel was filled with water having a predetermined seawater concentration in place of mere water. In the case of use of the vitrified grindstone having a pore size of 12 μm, a large amount of microbubbles were generated even at seawater concentrations of 50% and 100%. FIGS. 11(a) and 11(b) show the state of generation of microbubbles in test No. 31. (In FIGS. 11(a) and 11(b), the lower side of the drawings corresponds to the lower side of the pressure vessel 63.)

Notably, when the filter pore size is reduced, microbubbles can be readily generated even at a low pressure. However, since the flow rate lowers, the amount of injection reduces. By contrast, when the filter pore size is increased, microbubbles are unlikely to be generated unless a higher pressure is employed; however, the amount of injection can be increased. Thus, it is good practice to select a pore size of a filter to be used, according a depth for storage.

Figure 12A:
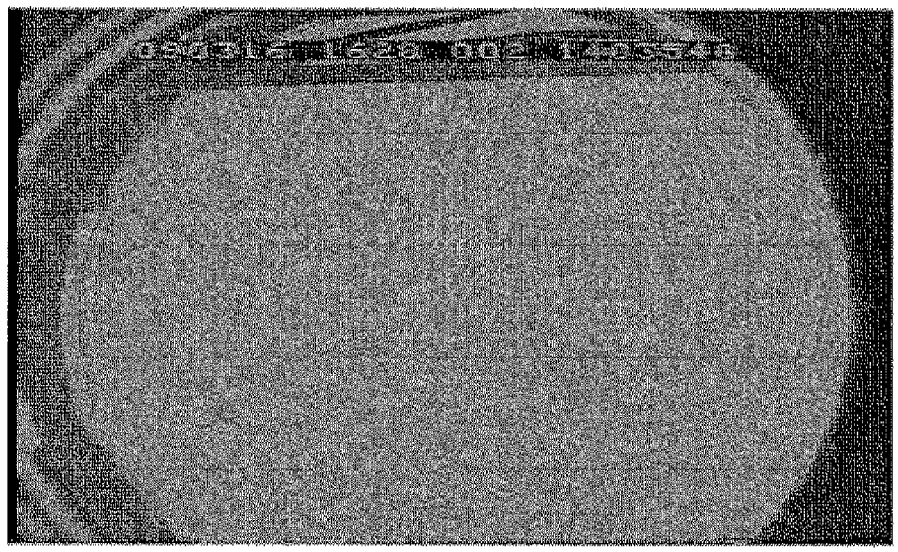
FIG. 12(a) is a photograph showing a state of generation of the microbubbles 75.
Figure 12B:
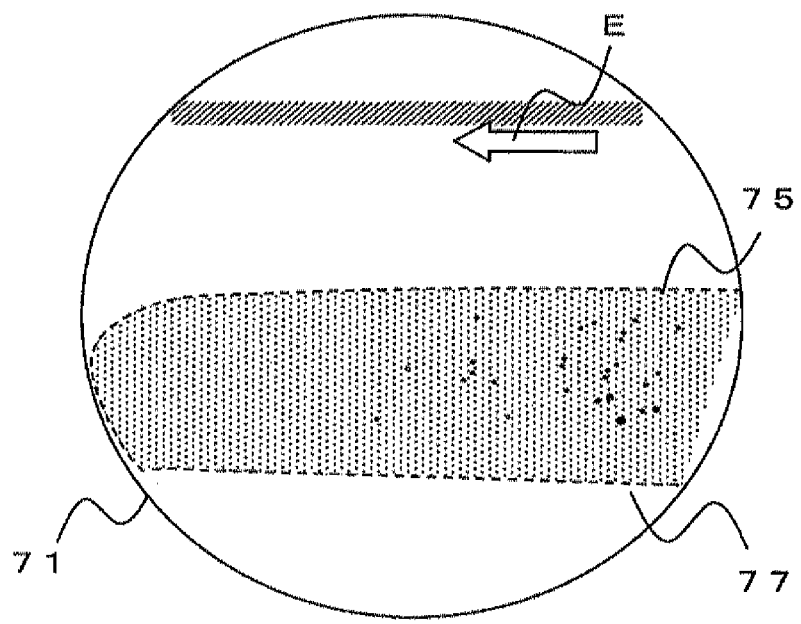
FIG. 12(b) is a schematic view showing the state of generation of the microbubbles 75.
Figure 13:
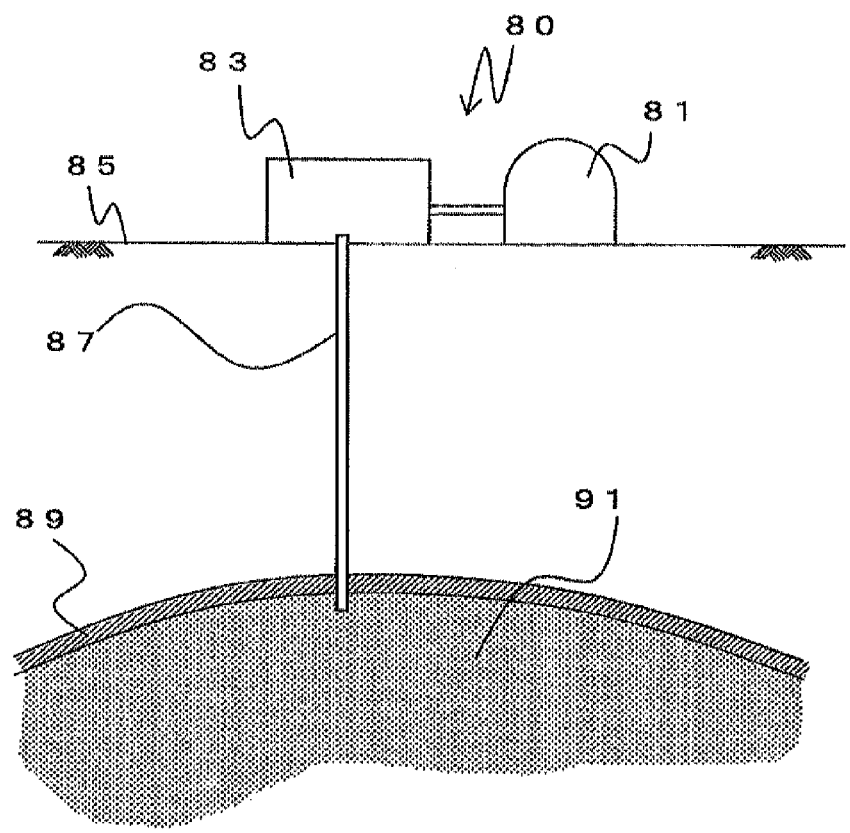
FIG. 13 is a view showing a carbon dioxide storage apparatus 80.

FIGS. 12(a) and 12(b) show the state of generation of microbubbles when carbon dioxide was formed into microbubbles under the conditions of 40° C., 10 MPa, and 7 ml/min with a sandstone layer disposed on the grindstone filter. FIG. 12(a) shows an image photographed by the camera 73. FIG. 12(b) is a schematic view of FIG. 12(a).

In actual storage of carbon dioxide in a storage layer, the state of generation of bubbles in an aquifer after carbon dioxide ejected from the filter has passed through a sandstone layer is important. Thus, Tako sandstone, which imitates a sandstone layer, was disposed on the filter 61 for studying the state of generation of bubbles from a sandstone layer. As a result, as shown in FIGS. 12(a) and 12(b), even when carbon dioxide passed through the filter 61 and the Tako sandstone disposed on the filter 61, the generation of microbubbles was confirmed. Similarly, in the case of use of Berea sandstone in place of Tako sandstone, the generation of microbubbles was also confirmed.

In this manner, when carbon dioxide is injected into the water 77 through the filter 61 of grindstone, the microbubbles 75 of carbon dioxide can be readily generated. By means of forming carbon dioxide into microbubbles, carbon dioxide is dissolved efficiently in the water 77. Even in the case of a mixture of water and carbon dioxide, the mixture injected into the water 77 through the filter 61 is formed into microbubbles. The above embodiments have been described while mentioning carbon dioxide. However, a substance other than carbon dioxide can also be formed into microbubbles by means of injection of the substance into water through a grindstone filter. Particularly, acetylene, ammonia, sulfur dioxide, hydrogen chloride, chlorine, and hydrogen sulfide are higher in water solubility than carbon dioxide under the same temperature and pressure conditions; thus, considerably accelerated dissolution can be expected in storage thereof.

According to the above-described embodiments of the present invention, by means of injecting carbon dioxide into a brine aquifer through a grindstone filter, which is a porous member, carbon dioxide is formed efficiently into microbubbles in the brine aquifer. Thus, carbon dioxide is dissolved efficiently in the brine aquifer and is fixed underground in the form of carbonate compounds through chemical reaction with components of rock, etc., such as Ca, Mg, and Na.

Since the state of carbon dioxide is not limited to a supercritical state, the range of applicable conditions is wide, and few limitations are imposed on locations of application. Further, since carbon dioxide can be injected directly into an underground brine aquifer, there is no need to pump up formation water from the underground brine aquifer, so that the apparatus size can be reduced.

While the embodiments of the present invention have been described with reference to the appended drawings, the technical scope of the present invention is not limited to the embodiments. It is apparent that those skilled in the art can easily arrive at various variations or modifications without departing from technical ideas described in claims, and these variations or modifications are to be construed as belonging to the technical scope of the present invention.

Figure 14:
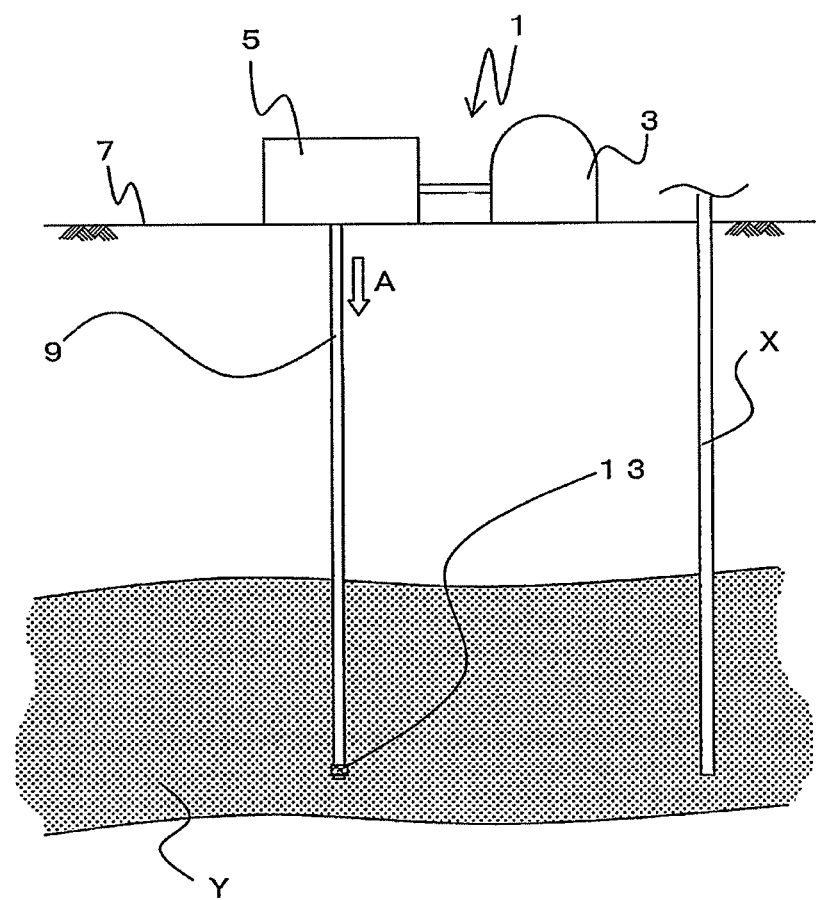
FIG. 14 is a view showing another exemplary carbon dioxide storage apparatus 1.

In FIG. 14, for example, by means of providing a production well (X), which extends to a gas field, an oil field, or oil sand (Y), and injecting carbon dioxide or the like underground through an injection well, enhanced recovery of gas, petroleum oil, heavy oil, etc. can be performed through the production well (X). According to a presently employed method of enhanced recovery of gas, petroleum oil, heavy oil, etc., carbon dioxide is injected under such a high pressure as to bring oil or the like and carbon dioxide into a state of solution or suspension, and enhanced recovery of oil or the like is performed through mixing of carbon dioxide and oil or the like to be produced. However, carbon dioxide and oil or the like are less likely to be brought into a state of solution or suspension in themselves. In actuality, enhanced recovery is not achieved unless carbon dioxide is injected under pressure to a gas field, an oil field, oil sand (Y), etc. present in a considerably deep location where a pressure enabling establishment of a state of solution or suspension can be maintained. Through application of the present invention to such enhanced recovery, injected carbon dioxide is formed into microbubbles, whereby carbon dioxide and oil or the like are more likely to be brought into a state of solution or suspension under a pressure lower than that in the conventional practice. Through application of the present invention to such enhanced recovery, enhanced recovery of gas, petroleum oil, heavy oil, etc. can be performed even in a gas field, an oil field, oil sand, etc. located at a relatively shallow depth, at which enhanced recovery has not been performed because of difficulty in bringing carbon dioxide and oil or the like into a state of solution or suspension.

At this time, after recovery of oil or the like from a mixture of water and oil or the like extracted through a production well (X), residual water is mixed with carbon dioxide, and the resultant mixture is injected underground, whereby excessively extracted water can be returned underground. Thus, land subsidence or the like is restrained, and carbon dioxide can be injected efficiently into a brine aquifer.

DESCRIPTION OF REFERENCE NUMERALS 1, 20, 30: carbon dioxide storage apparatus
3: carbon dioxide tank
5: pumping apparatus
7: ground surface
9: injection well
11: brine aquifer
13: filter
15: microbubble
31: sea surface
33: sea bottom
40: carbon dioxide storage test apparatus
41: carbon dioxide tank
43: syringe pump
45: pressure regulation valve
47: valve
49: piping
51: water tank
53: syringe pump
55: pressure regulation valve
57: valve
59: piping
61: filter
63: pressure vessel
65: release valve
67: lighting window
69: lighting
71: photographing window
73: camera
75: microbubble
77: water
79: bubble
80: carbon dioxide storage apparatus
81: carbon dioxide tank
83: pumping apparatus
85: ground surface
87: injection well
89: seal layer
91: storage layer

The invention claimed is:

1. A device for sequestering a substance, comprising:
an injection well extending to a brine aquifer;
a pumping apparatus for pumping to the injection well a substance which includes at least one of carbon dioxide, a substance higher in water solubility than carbon dioxide, and methane; and
a porous member of ceramic provided in the vicinity of a tip of the injection well, wherein:
the porous member is formed through firing of a mixture of ceramic particles and a binder for binding the ceramic particles together, a mode of a pore size distribution is 28 µm or less and a full width at half maximum of the pore size distribution is 6.0 µm or less,
the substance pumped into the injection well can be injected into the brine aquifer via the porous member,
the substance injected from the porous member into the brine aquifer is in a liquid state, a gaseous state, or a mixed state thereof, and
in the course of injection of the substance from the porous member into the brine aquifer, microbubbles of the substance are generated.

2. A device for sequestering a substance according to claim 1, wherein the porous member is a vitrified grindstone formed through firing of a mixture of ceramic particles and a binder for binding the ceramic particles together, a mode of a pore size distribution is 28 µm or less, and a full width at half maximum of the pore size distribution is 6.0 µm or less.

3. A device for sequestering a substance according to claim 1, wherein the porous member is a vitrified grindstone formed through firing of a mixture of ceramic particles and a binder for binding the ceramic particles together, a mode of a pore size distribution is 12 µm or less, and a full width at half maximum of the pore size distribution is 2.0 µm or less.

4. A method for sequestering a substance in a brine aquifer, comprising the steps of:
providing a porous member in the vicinity of a tip of an injection well extending to the brine aquifer, the porous member being formed through firing of a mixture of ceramic particles and a binder for binding the ceramic particles together and having a mode of a pore size distribution of 28 µm or less and a full width at half maximum of the pore size distribution of 6.0 µm or less; and
injecting the substance being in a liquid state, gaseous state, or mixed state thereof into the brine aquifer via the porous member to thereby generate microbubbles of the substance.

* * * * *